United States Patent
Ino et al.

(10) Patent No.: US 6,732,039 B2
(45) Date of Patent: May 4, 2004

(54) VEHICLE SPEED CONTROL SYSTEM

(75) Inventors: Junsuke Ino, Tokyo (JP); Kazutaka Adachi, Yokohama (JP); Takeshi Ishizu, Tokyo (JP); Hideki Sudo, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/030,623

(22) PCT Filed: May 14, 2001

(86) PCT No.: PCT/JP01/03973

§ 371 (c)(1),
(2), (4) Date: Jan. 11, 2002

(87) PCT Pub. No.: WO01/87662

PCT Pub. Date: Nov. 22, 2001

(65) Prior Publication Data

US 2003/0105574 A1 Jun. 5, 2003

(51) Int. Cl.[7] ............................................. B60K 41/14
(52) U.S. Cl. ............................ 701/93; 701/51; 701/95; 180/197
(58) Field of Search .......................... 701/51, 55, 56, 701/64, 93, 95; 180/176, 179

(56) References Cited

U.S. PATENT DOCUMENTS 4,936,403 A * 6/1990 Morimoto ................. 180/176
4,947,953 A * 8/1990 Morimoto ................. 180/179
6,311,118 B1 * 10/2001 Ito et al. ..................... 701/95

FOREIGN PATENT DOCUMENTS

| EP | 0 306 216 | 3/1989 |
| EP | 0 306 229 | 3/1989 |
| EP | 0 389 262 | 9/1990 |
| EP | 0 531 552 | 3/1993 |
| EP | 0 612 641 | 8/1994 |
| EP | 1 052 132 | 11/2000 |

* cited by examiner

Primary Examiner—Tan Q. Nguyen
(74) Attorney, Agent, or Firm—Foley & Lardner

(57) ABSTRACT

A vehicle speed control system is installed to a vehicle equipped with an engine and a continuously variable transmission (CVT). The vehicle control system is comprised of a controller arranged to execute a vehicle speed control, to suspend the vehicle speed control when a throttle opening is increased to be greater than a target throttle opening for the vehicle speed control and to restart the suspended vehicle speed control when the throttle opening becomes smaller than the target throttle opening. Further, the controller is arranged to decrease the throttle opening and to execute a shift down of the CVT when the vehicle speed at the moment of restarting the vehicle speed control is greater than or equal to the target vehicle speed. Therefore, this vehicle speed control system can quickly and smoothly decelerate the vehicle without generating shift shocks when the vehicle speed control is restarted.

13 Claims, 8 Drawing Sheets

— 1 —

VEHICLE SPEED CONTROL SYSTEM

TECHNICAL FIELD

The present invention relates to a vehicle speed control system for controlling a vehicle speed, and more particularly to a vehicle speed control system which controls an automotive vehicle so as to automatically cruise the automotive vehicle at a target vehicle speed.

BACKGROUND ART

A typical vehicle speed control system is arranged to suspend a vehicle cruise control when the vehicle is accelerated over a target vehicle speed by the depression of an accelerator pedal, and to restart the vehicle cruise control when the throttle opening is returned to a set throttle opening for the cruise control.

DISCLOSURE OF INVENTION

Accordingly, the vehicle cruise control is restarted from a traveling condition at a vehicle speed higher than the target vehicle speed, and therefore the vehicle speed is decreased to the target vehicle speed by closing a throttle.

However, such a typical vehicle speed control system has executed the deceleration control at this restart of the cruise control without employing a transmission and a brake system. Therefore, when the vehicle requires a further deceleration in addition to the deceleration due to the throttle control, such as during a down slope traveling, a conversion to the target vehicle speed is not suitable. Further, if the vehicle is equipped with an automatic transmission except for a continuously variable transmission, the utilization of the deceleration due to the non CVT automatic transmission will cause shift shocks which will apply unsuitable feeling to vehicle occupants. Further, if the deceleration due to the brake system is employed during the down slope traveling, the brake system will cause the brake fade and will degrade the braking performance of the brake system.

It is therefore an object of the present invention to provide an improved vehicle speed control system which is capable of quickly decelerating the vehicle from an over target speed to a target vehicle speed without generating shift shocks and the brake fade.

A vehicle speed control system according to the present invention is for a vehicle equipped with an engine and a continuously variable transmission (CVT). The vehicle control system comprises a controller which is arranged to execute a vehicle speed control for bringing a vehicle speed closer to a target vehicle speed, to suspend the vehicle speed control when a throttle opening is increased to an opening which is greater than a target throttle opening for the vehicle speed control, to restart the suspended vehicle speed control when the throttle opening becomes smaller than the target throttle opening, and to decrease the throttle opening and to execute a shift down of the CVT when the vehicle speed at the moment of restarting the vehicle speed control is greater than or equal to the target vehicle speed.

BEST MODE FOR CARRYING OUT THE INVENTION

Referring to FIGS. 1 to 12, there is shown a vehicle speed control system according to an embodiment of the present invention.

Figure 1:
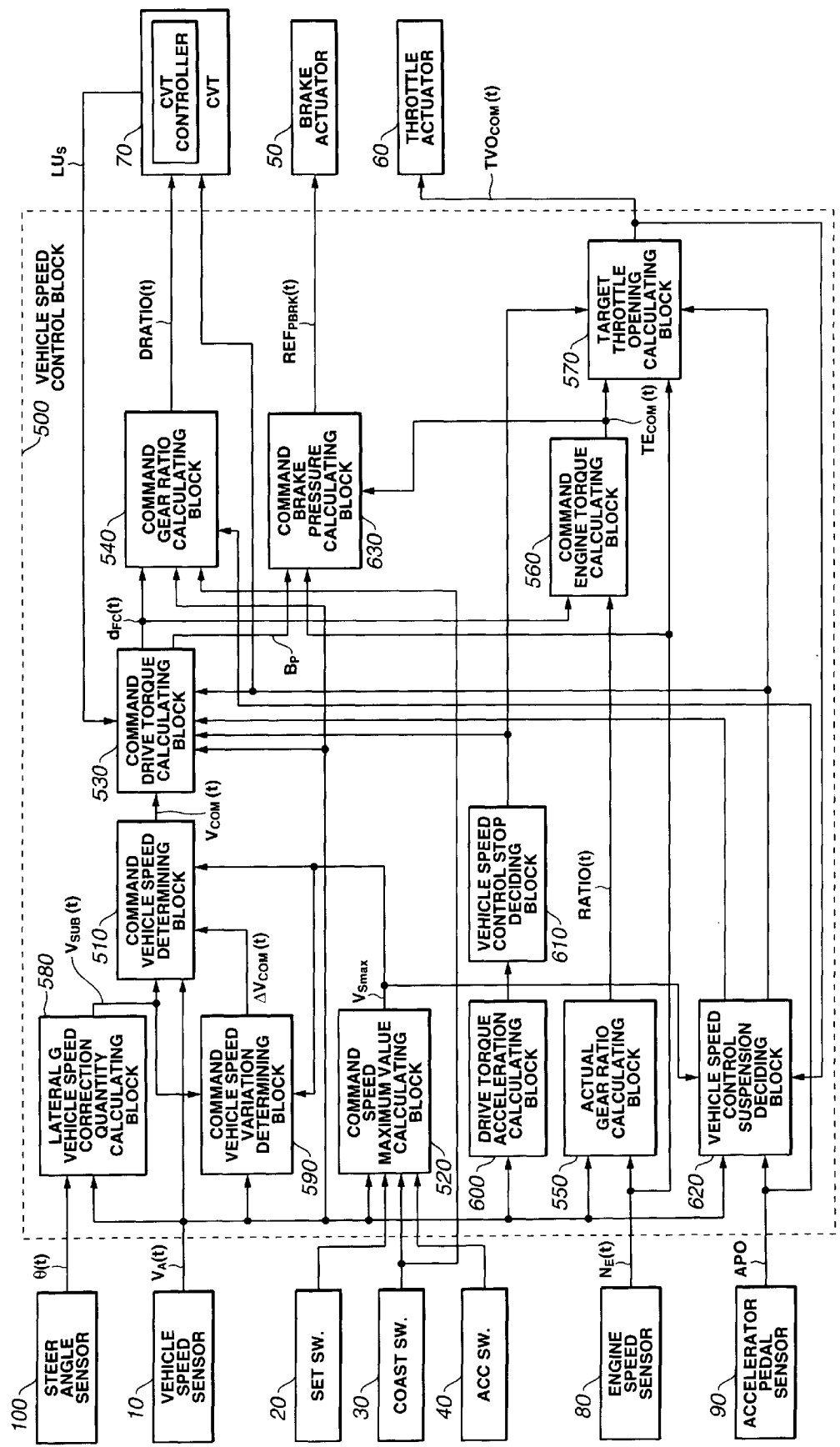
FIG. 1 is a block diagram showing a structure of a vehicle speed control system according to the present invention.

FIG. 1 shows a block diagram showing a construction of the vehicle speed control system according to the embodiment of the present invention. With reference to FIGS. 1 to 12, the construction and operation of the vehicle speed control system according to the present invention will be discussed hereinafter.

The vehicle speed control system according to the present invention is equipped on a vehicle and is put in a standby mode in a manner that a vehicle occupant manually switches on a system switch (not shown) of the speed control system. Under this standby mode, when a set switch 20 is switched on, the speed control system starts operations.

The vehicle speed control system comprises a vehicle speed control block 500 which is constituted by a microcomputer and peripheral devices. Blocks in vehicle speed control block 500 represent operations executed by this microcomputer. Vehicle speed control block 500 receives signals from a steer angle sensor 100, a vehicle speed sensor 10, the set switch 20, a coast switch 30, an accelerate (ACC) switch 40, an engine speed sensor 80, an accelerator pedal sensor 90 and a continuously variable transmission (CVT) 70. According to the signals received, vehicle speed control block 500 calculates various command values and outputs these command values to CVT 70, a brake actuator 50 and a throttle actuator 60 of the vehicle, respectively, to control an actual vehicle speed at a target vehicle speed.

A command vehicle speed determining block 510 of vehicle speed control block 500 calculates a command vehicle speed $V_{COM}(t)$ by each control cycle, such as by 10 ms. A suffix (t) denotes that the value with the suffix (t) is a value at the time t and is varied in time series (time elapse). In some graphs, such suffix (t) is facilitated.

A command vehicle speed maximum value setting block 520 sets a vehicle speed $V_A(t)$ as a command vehicle speed maximum value $V_{SMAX}$ (target speed) at time when set switch 30 is switched on. Vehicle speed $V_A(t)$ is an actual vehicle speed which is detected from a rotation speed of a tire rotation speed by means of a vehicle speed sensor 10.

After command vehicle speed maximum value $V_{SMAX}$ is set by the operation of set switch 20, command vehicle speed setting block 520 decreases command vehicle speed maximum value $V_{SMAX}$ by 5 km/h in reply to one push of coast switch 30. That is, when coast switch 30 is pushed a number n of times (n times), command vehicle speed $V_{SMAX}$ is decreased by n×5 km/h. Further, when coast switch 30 has been pushed for a time period T (sec.), command vehicle speed $V_{SMAX}$ is decreased by a value T/1(sec.)×5 km/h.

Similarly, after command vehicle speed maximum value $V_{SMAX}$ is set by the operation of set switch 20, command vehicle speed setting block 520 increases command vehicle speed maximum value $V_{SMAX}$ by 5 km/h in reply to one push of ACC switch 40. That is, when ACC switch 40 is pushed a number A of times (n times), command vehicle speed maximum value $V_{SMAX}$ is increased by n×5 km/h. Further, ACC switch 40 has been pushed for a time period T (sec.), command vehicle speed maximum value $V_{SMAX}$ is increased by a value T/1(sec.)×5 (km/h).

Figure 2:
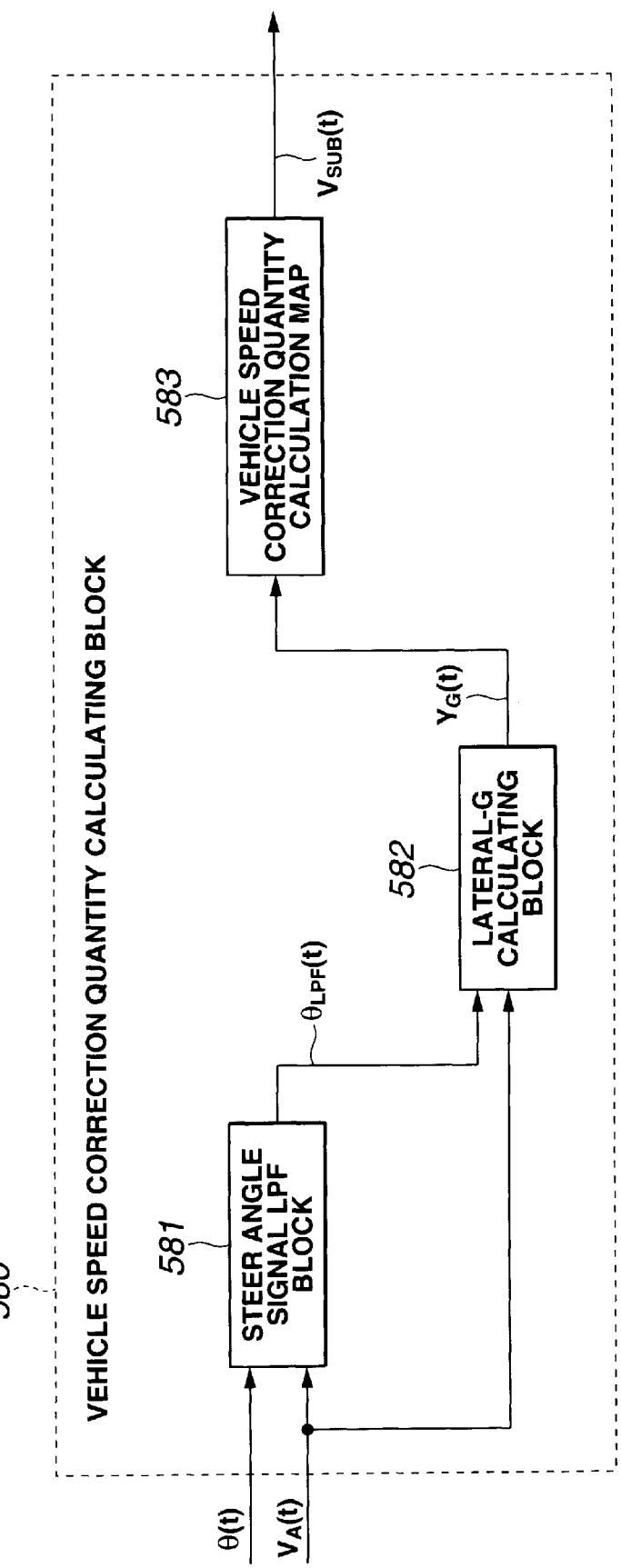
FIG. 2 is a block diagram showing a structure of a lateral-acceleration vehicle-speed correction-quantity calculating block 580.
Figure 3:
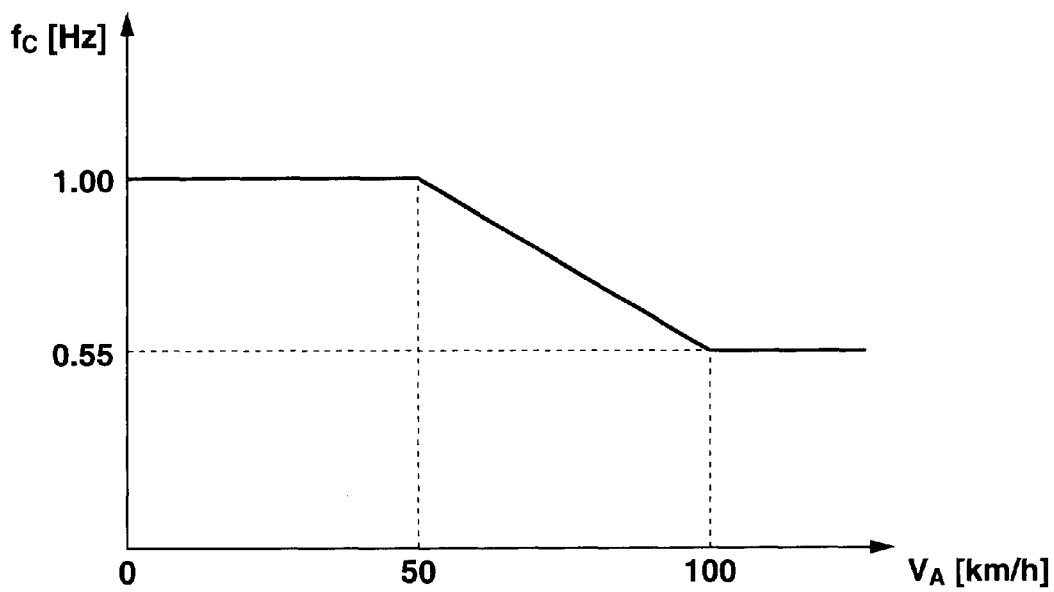
FIG. 3 is a graph showing a relationship between a vehicle speed $V_A(t)$ and a cutoff frequency fc of a low pass filter.

A lateral acceleration (lateral G) vehicle-speed correction-quantity calculating block 580 receives a steer angle $\theta(t)$ from steer angle sensor 100 and vehicle speed $V_A(t)$ from vehicle speed sensor 10, and calculates a vehicle speed correction quantity $V_{SUB}(t)$ which is employed to correct the command vehicle speed $V_{COM}(t)$ according to a lateral acceleration (hereinafter, it called a lateral-G). More specifically, lateral-G vehicle-speed correction-quantity calculating section 580 comprises a steer angle signal low-pass filter (hereinafter, it called a steer angle signal LPF block) 581, a lateral-G calculating block 582 and a vehicle speed correction quantity calculation map 583, as shown in FIG. 2.

Steer angle signal LPF block 581 receives vehicle speed $V_A(t)$ and steer angle $\theta(t)$ and calculates a steer angle LPF value $\theta_{LPF}(t)$. Steer angle LPF value $\theta_{LPF}(t)$ is represented by the following equation (1).

$$\theta_{LPF}(t)=\theta(t)/(TSTR \cdot s+1) \quad (1)$$

In this equation (1), s is a differential operator, and TSTR is a time constant of the low-pass filter (LPF) and is represented by TSTR=1/(2π·fc). Further, fc is a cutoff frequency of LPF and is determined according to vehicle speed $V_A(t)$ as shown by a map showing a relationship between cutoff frequency fc and vehicle speed $V_A(t)$ in FIG. 3. As is clear from the map of FIG. 3, cutoff frequency fc becomes smaller as the vehicle speed becomes higher. For example, a cutoff frequency at the vehicle speed 100 km/h is smaller than that at the vehicle speed 50 km/h.

Lateral-G calculating block 582 receives steer angle LPF value $\theta_{LPF}(t)$ and vehicle speed $V_A(t)$ and calculates the lateral-G $Y_G(t)$ from the following equation (2).

$$Y_G(t)=\{V_A(t)^2 \cdot \theta_{LPF}(t)\}/\{N \cdot W \cdot [1+A \cdot V_A(t)^2]\} \quad (2)$$

In this equation (2), W is a wheelbase dimension of the vehicle, N is a steering gear ratio, and A is a stability factor. The equation (2) is employed in case that the lateral G of the vehicle is obtained from the steer angle.

When the lateral G is obtained by using a yaw-rate sensor and processing the yaw rate $\psi(t)$ by means of a low-pass filter (LPF), the lateral-G $Y_G(t)$ is obtained from the following equations (3) and (4).

$$Y_G(t)=V_A(t) \cdot \psi_{LPF} \quad (3)$$

$$\psi_{LPF}=\psi(t)/(T_{YAW} \cdot s+1) \quad (4)$$

In the equation (4), $T_{YAW}$ is a time constant of the low-pass filter. The time constant $T_{YAW}$ increases as vehicle speed $V_A(t)$ increases.

Vehicle speed correction calculation map 583 calculates a vehicle speed correction quantity $V_{SUB}(t)$ which is employed to correct command vehicle speed $V_{COM}(t)$ according to lateral-G $Y_G(t)$. Vehicle speed correction quantity $V_{SUB}(t)$ is calculated by multiplying a correction coefficient CC determined from the lateral G and a predetermined variation limit of command vehicle speed $V_{COM}(t)$. In this embodiment, the predetermined variation limit of command vehicle speed $V_{COM}(t)$ is set at 0.021 (km/h/10 ms)= 0.06 G. The predetermined variation limit of the command vehicle speed is equal to the maximum value of a variation (corresponding to acceleration/deceleration) $\Delta V_{COM}(t)$ of the command vehicle speed shown in FIG. 6.

$$V_{SUB}(t)=CC \times 0.021 (km/h/10 \text{ ms}) \quad (5)$$

As mentioned later, the vehicle speed correction quantity $V_{SUB}(t)$ is added as a subtraction term in the calculation process of the command vehicle speed $V_{COM}(t)$ which is employed to control the vehicle speed. Accordingly, command vehicle speed $V_{COM}(t)$ is limited to a smaller value as vehicle correction quantity $V_{SUB}(t)$ becomes larger.

Figure 4:
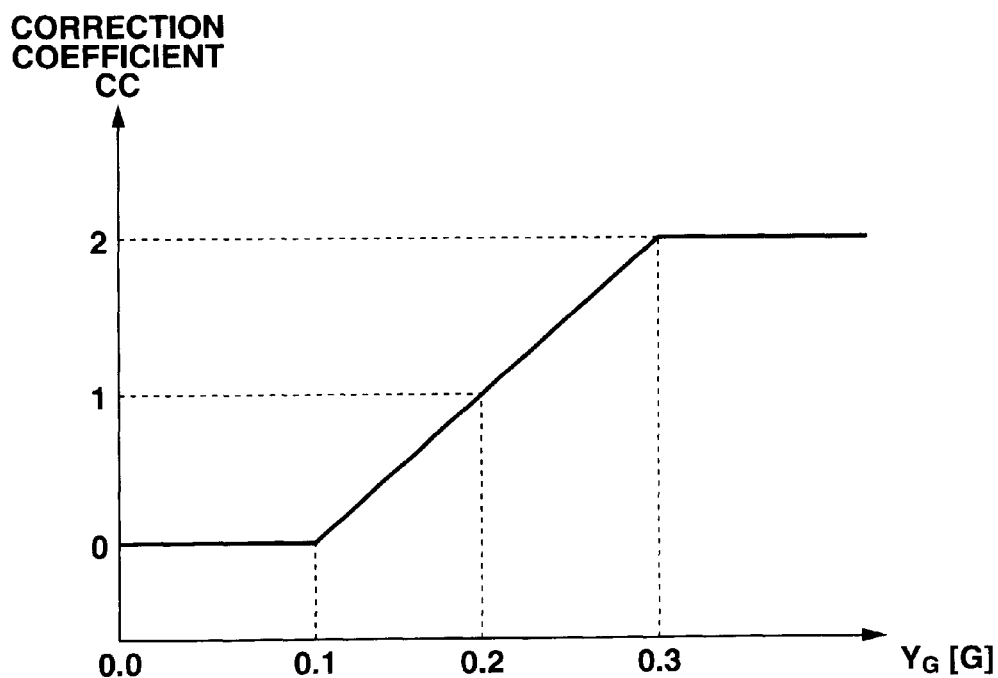
FIG. 4 is a graph showing a relationship between a correction coefficient CC for calculating a vehicle speed correction quantity $V_{SUB}(t)$ and a value $Y_G(t)$ of the lateral acceleration.
Figure 5:
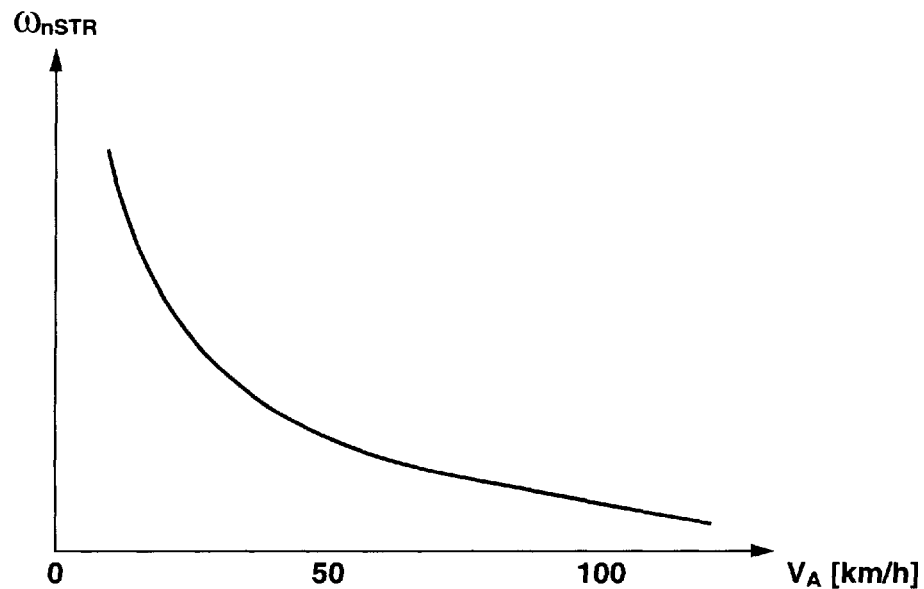
FIG. 5 is a graph showing a relationship between a natural frequency $\omega_{nSTR}$ and the vehicle speed.

Correction coefficient CC becomes larger as lateral-G $Y_G$ becomes larger, as shown in FIG. 4. The reason thereof is that the change of command vehicle speed $V_{COM}(t)$ is limited more as the lateral-G becomes larger. However, when the lateral-G is smaller than or equal to 0.1 G as shown in FIG. 4, correction coefficient CC is set at zero since it is decided that it is not necessary to correct command vehicle speed $V_{COM}(t)$. Further, when the lateral-G is greater than or equal to 0.3 G, correction coefficient CC is set at a predetermined constant value. That is, the lateral-G never becomes greater than or equal to 0.3 G as far as the vehicle is operated under a usual driving condition. Therefore, in order to prevent the correction coefficient CC from being set at an excessively large value when the detection value of the lateral-G erroneously becomes large, the correction coefficient CC is set at such a constant value, such as at 2.

When a driver requests to increase the target vehicle speed by operating accelerate switch 40, that is, when acceleration of the vehicle is requested, the command vehicle speed $V_{COM}(t)$ is calculated by adding present vehicle speed $V_A(t)$ and command vehicle speed variation $\Delta V_{COM}(t)$ and by subtracting vehicle speed correction quantity $V_{SUB}(t)$ from the sum of present vehicle speed $V_A(t)$ and command vehicle speed variation $\Delta V_{COM}(t)$.

Therefore, when command vehicle speed variation $\Delta V_{COM}(t)$ is greater than vehicle speed correction quantity $V_{SUB}(t)$, the vehicle is accelerated. When command vehicle speed variation $\Delta V_{COM}(t)$ is smaller than vehicle speed correction quantity $V_{SUB}(t)$, the vehicle is decelerated. Vehicle speed correction quantity $V_{SUB}(t)$ is obtained by multiplying the limit value of the command vehicle speed variation (a maximum value of the command vehicle speed variation) with correction coefficient CC shown in FIG. 4. Therefore, when the limit value of the command vehicle speed variation is equal to the command vehicle speed variation and when correction coefficient CC is 1, the amount for acceleration becomes equal to the amount for deceleration. In case of FIG. 4, when $Y_G(t)=0.2$, the amount for acceleration becomes equal to the amount for deceleration. Accordingly, the present vehicle speed is maintained when the correction coefficient CC is 1. In this example, when the lateral-G $Y_G(t)$ is smaller than 0.2, the vehicle is accelerated. When the lateral-G $Y_G(t)$ is larger than 0.2, the vehicle is decelerated.

When the driver requests to lower the target vehicle speed by operating coast switch 30, that is, when the deceleration of the vehicle is requested, the command vehicle speed $V_{COM}(t)$ is calculated by subtracting command vehicle speed variation $\Delta V_{COM}(t)$ and vehicle speed correction quantity $V_{SUB}(t)$ from present vehicle speed $V_A(t)$. Therefore, in this case, the vehicle is always decelerated. The degree of the deceleration becomes larger as vehicle speed correction quantity $V_{SUB}(t)$ becomes larger. That is, vehicle speed correction quantity $V_{SUB}(t)$ increases according to the increase of the lateral-G $Y_G(t)$. The above-mentioned value 0.021 (km/h/10 ms) has been defined on the assumption that the vehicle is traveling on a highway.

As mentioned above, vehicle speed correction quantity $V_{SUB}(t)$ is obtained from the multiple between the correction coefficient CC according to the lateral acceleration and the limit value of the command vehicle speed variation $V_{COM}(t)$. Accordingly, the subtract term (vehicle speed correction quantity) increases according to the increase of the lateral acceleration so that the vehicle speed is controlled so as to suppress the lateral-G. However, as mentioned in the explanation of steer angle signal LPF block 581, the cutoff frequency fc is lowered as the vehicle speed becomes larger. Therefore the time constant TSTR of the LPF is increased, and the steer angle LPF $\theta_{LPF}(t)$ is decreased. Accordingly, the lateral acceleration estimated at the lateral-G calculating block 581 is also decreased. As a result, the vehicle speed correction quantity $V_{SUB}(t)$, which is obtained from the vehicle speed correction quantity calculation map 583, is decreased. Consequently, the steer angle becomes ineffective as to the correction of the command vehicle speed. In other words, the correction toward the decrease of the acceleration becomes smaller due to the decrease of vehicle speed correction quantity $V_{SUB}(t)$.

More specifically, the characteristic of the natural frequency $\omega_{nSTR}$ relative to the steer angle is represented by the following equation (6).

$$\omega_{nSTR} = (2W/V_A)\sqrt{[Kf \cdot Kr \cdot (1 + A \cdot V_A^2)/m_v \cdot I]} \quad (6)$$

In this equation (6), Kf is a cornering power of one front tire, Kr is a cornering power of one rear tire, W is a wheelbase dimension, $m_v$ is a vehicle weight, A is a stability factor, and I is a vehicle yaw inertia moment.

The characteristic of the natural frequency $\omega_{nSTR}$ performs such that the natural frequency $\omega_{nSTR}$ becomes smaller and the vehicle responsibility relative to the steer angle degrades as the vehicle speed increases, and that the natural frequency $\omega_{nSTR}$ becomes greater and the vehicle responsibility relative to the steer angle is improved as the vehicle speed decreases. That is, the lateral-G tends to be generated according to a steering operation as the vehicle speed becomes lower, and the lateral-G due to the steering operation tends to be suppressed as the vehicle speed becomes higher. Therefore, the vehicle speed control system according to the present invention is arranged to lower the responsibility by decreasing the cutoff frequency fc according to the increase of the vehicle speed so that the command vehicle speed tends not to be affected by the correction due to the steer angle as the vehicle speed becomes higher.

Figure 6:
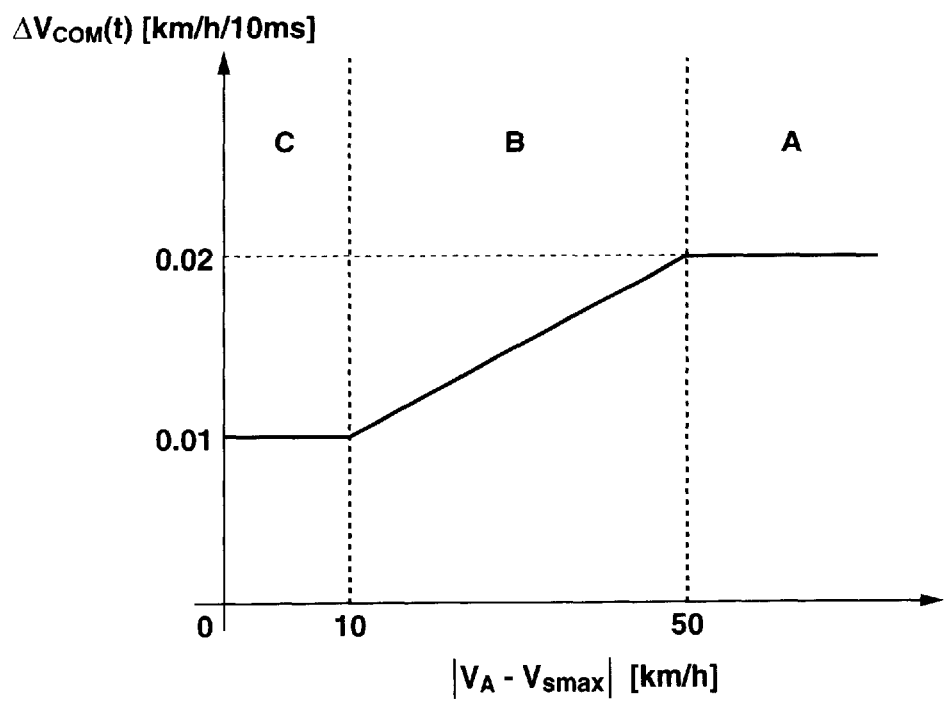
FIG. 6 is a graph showing a relationship between an absolute value of a deviation between vehicle speed $V_A(t)$ and a maximum value $V_{SMAX}$ of a command vehicle speed, and a command vehicle speed variation $\Delta V_{COM}(t)$.

A command vehicle speed variation determining block 590 receives vehicle speed $V_A(t)$ and command vehicle speed maximum value $V_{SMAX}$ and calculates the command vehicle speed variation $\Delta V_{COM}(t)$ from the map shown in FIG. 6 on the basis of an absolute value $|V_A - V_{SMAX}|$ of a deviation between the vehicle speed $V_A(t)$ and the command vehicle speed maximum value $V_{SMAX}$.

The map for determining command vehicle speed variation $\Delta V_{COM}(t)$ is arranged as shown in FIG. 6. More specifically, when absolute value $|V_A - V_{SMAX}|$ of the deviation is within a range B in FIG. 6, the vehicle is quickly accelerated or decelerated by increasing command vehicle speed variation $\Delta V_{COM}(t)$ as the absolute value of the deviation between vehicle speed $V_A(t)$ and command vehicle speed maximum value $V_{SMAX}$ is increased within a range where command vehicle speed variation $\Delta V_{COM}(t)$ is smaller than acceleration limit a for deciding the stop of the vehicle speed control. Further, when the absolute value of the deviation is small within the range B in FIG. 6, command vehicle speed variation $\Delta V_{COM}(t)$ is decreased as the absolute value of the deviation decreases within a range where the driver can feel an acceleration of the vehicle and the command vehicle speed variation $\Delta V_{COM}(t)$ does not overshoot maximum value $V_{SMAX}$ of the command vehicle speed. When the absolute value of the deviation is large and within a range A in FIG. 6, command vehicle speed variation $\Delta V_{COM}(t)$ is set at a constant value which is smaller than acceleration limit α, such as at 0.06 G. When the absolute value of the deviation is small and within a range C in FIG. 6, command vehicle speed variation $\Delta V_{COM}(t)$ is set at a constant value, such as at 0.03 G.

Command vehicle speed variation determining block 590 monitors vehicle speed correction quantity $V_{SUB}(t)$ outputted from lateral-G vehicle speed correction quantity calculating block 580, and decides that a traveling on a curved road is terminated when vehicle speed correction quantity $V_{SUB}(t)$ is returned to zero after vehicle speed correction quantity $V_{SUB}(t)$ took a value except for zero from zero. Further, command vehicle speed variation determining block 590 detects whether vehicle speed $V_A(t)$ becomes equal to maximum value $V_{SMAX}$ of the command vehicle speed.

When it is decided that the traveling on a curved road is terminated, the command vehicle speed variation $\Delta V_{COM}(t)$ is calculated from vehicle speed $V_A(t)$ at the moment when it is decided that the traveling on a curved road is terminated, instead of determining the command vehicle speed variation $\Delta V_{COM}(t)$ by using the map of FIG. 6 on the basis of the absolute value of a deviation between vehicle speed $V_A(t)$ and maximum value $V_{SMAX}$ of the command vehicle speed. The characteristic employed for calculating the command vehicle speed variation $\Delta V_{COM}(t)$ under the curve-traveling terminated condition performs a tendency which is similar to that of FIG. 6. More specifically, in this characteristic employed in this curve terminated condition, a horizontal axis denotes vehicle speed $V_A(t)$ instead of absolute value $|V_A(t) - V_{SMAX}|$. Accordingly, command vehicle speed variation $\Delta V_{COM}(t)$ becomes small as vehicle speed $V_A(t)$ becomes small. This processing is terminated when vehicle speed $V_A(t)$ becomes equal to maximum value $V_{SMAX}$ of the command vehicle speed.

Instead of the above determination method of command vehicle speed variation $\Delta V_{COM}(t)$ at the termination of the curved road traveling, when vehicle speed correction quantity $V_{SUB}(t)$ takes a value except for zero, it is decided that the curved road traveling is started. Under this situation, vehicle speed $V_A(t1)$ at a moment t1 of starting the curved road traveling may be previously stored, and command vehicle speed variation $\Delta V_{COM}(t)$ may be determined from a magnitude of a difference $\Delta V_A$ between vehicle speed $V_A(t1)$ at the moment t1 of the start of the curved road traveling and vehicle speed $V_A(t2)$ at the moment t2 of the termination of the curved road traveling. The characteristic employed for calculating the command vehicle speed variation $\Delta V_{COM}(t)$ under this condition performs a tendency which is opposite to that of FIG. 6. More specifically, in this characteristic curve, there is employed a map in which a horizontal axis denotes vehicle speed $V_A(t)$ instead of $|V_A(t)-V_{SMAX}|$. Accordingly, command vehicle speed variation $\Delta V_{COM}(t)$ becomes smaller as vehicle speed $V_A(t)$ becomes larger. This processing is terminated when vehicle speed $V_A(t)$ becomes equal to maximum value $V_{SMAX}$ of the command vehicle speed.

That is, when the vehicle travels on a curved road, the command vehicle speed is corrected so that the lateral-G is suppressed within a predetermined range. Therefore, the vehicle speed is lowered in this situation generally. After the traveling on a curved road is terminated and the vehicle speed is decreased, the command vehicle speed variation $\Delta V_{COM}(t)$ is varied according to vehicle speed $V_A(t)$ at the moment of termination of the curved road traveling or according to the magnitude of the difference $\Delta V_A$ between vehicle speed $V_A(t1)$ at the moment t1 of staring of the curved road traveling and vehicle speed $V_A(t2)$ at the moment t2 of the termination of the curved road traveling.

Further, when the vehicle speed during the curved road traveling is small or when vehicle speed difference $\Delta V_A$ is small, command vehicle speed variation $\Delta V_{COM}(t)$ is set small and therefore the acceleration for the vehicle speed control due to the command vehicle speed is decreased. This operation functions to preventing a large acceleration from being generated by each curve when the vehicle travels on a winding road having continuous curves such as a S-shape curved road. Similarly, when the vehicle speed is high at the moment of the termination of the curved road traveling, or when vehicle speed difference $\Delta V_A$ is small, it is decided that the traveling curve is single and command vehicle speed variation $\Delta V_{COM}(t)$ is set at a large value. Accordingly, the vehicle is accelerated just after the traveling of a single curved road is terminated, and therefore the driver of the vehicle becomes free from a strange feeling due to the slow-down of the acceleration.

Command vehicle speed determining block 510 receives vehicle speed $V_A(t)$, vehicle speed correction quantity $V_{SUB}(t)$, command vehicle speed variation $\Delta V_{COM}(t)$ and maximum value $V_{SMAX}$ of the command vehicle speed and calculates command vehicle speed $V_{COM}(t)$ as follows.

(a) When maximum value $V_{SMAX}$ of the command vehicle speed is greater than vehicle speed $V_A(t)$, that is, when the driver requests accelerating the vehicle by operating accelerate switch 40 (or a resume switch), command vehicle speed $V_{COM}(t)$ is calculated from the following equation (7).

$$V_{COM}(t)=\min[V_{SMAX}, V_A(t)+\Delta V_{COM}(t)-V_{SUB}(t)] \tag{7}$$

That is, smaller one of maximum value $V_{SMAX}$ and the value $[V_A(t)+\Delta V_{COM}(t)-V_{SUB}(t)]$ is selected as command vehicle speed $V_{COM}(t)$.

(b) When $V_{SMAX}=V_A(t)$, that is, when the vehicle travels at a constant speed, command vehicle speed $V_{COM}(t)$ is calculated from the following equation (8).

$$V_{COM}(t)=V_{SMAX}-V_{SUB}(t) \tag{8}$$

That is, command vehicle speed $V_{COM}(t)$ is obtained by subtracting vehicle speed correction quantity $V_{SUB}(t)$ from maximum value $V_{SMAX}$ of the command vehicle speed.

(c) When maximum value $V_{SMAX}$ of the command vehicle speed is smaller than vehicle speed $V_A(t)$, that is, when the driver requests to decelerate the vehicle by operating coast switch 30, command vehicle speed $V_{COM}(t)$ is calculated from the following equation (9).

$$V_{COM}(t)=\max[V_{SMAX}, V_A(t)-\Delta V_{COM}(t)-V_{SUB}(t)] \tag{9}$$

That is, larger one of maximum value $V_{SMAX}$ and the value $[V_A(t)-\Delta V_{COM}(t)-V_{SUB}(t)]$ is selected as command vehicle speed $V_{COM}(t)$.

Command vehicle speed $V_{COM}(t)$ is determined from the above-mentioned manner, and the vehicle speed control system controls vehicle speed $V_A(t)$ according to the determined command vehicle speed $V_{COM}(t)$.

Figure 7:
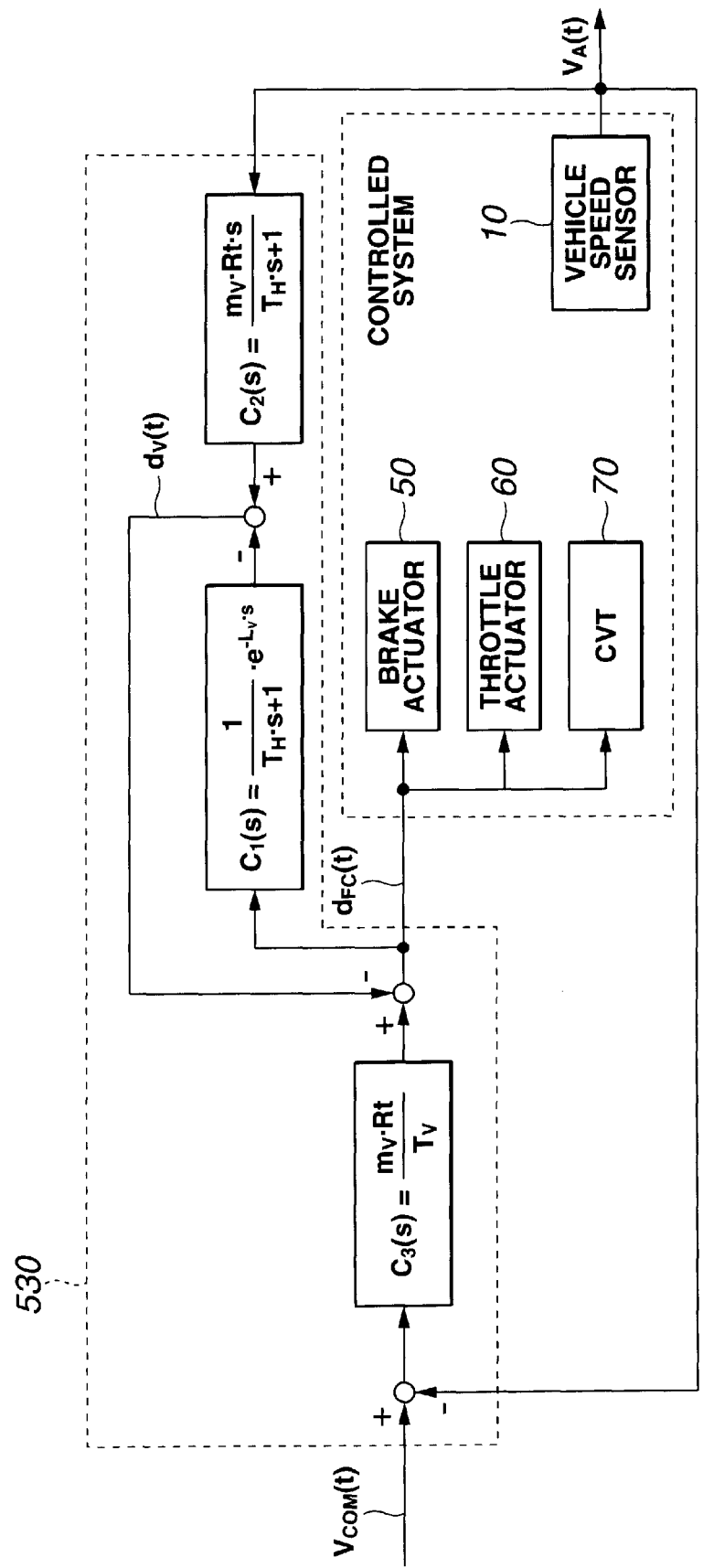
FIG. 7 is a block diagram showing a structure of a command drive torque calculating block 530.

A command drive torque calculating block 530 of vehicle speed control block 500 in FIG. 1 receives command vehicle speed $V_{COM}(t)$ and vehicle speed $V_A(t)$ and calculates a command drive torque $d_{FC}(t)$. FIG. 7 shows a construction of command drive torque calculating block 530.

When the input is command vehicle speed $V_{COM}(t)$ and the output is vehicle speed $V_A(t)$, a transfer characteristic (function) $G_v(s)$ thereof is represented by the following equation (10).

$$G_v(s)=1/(T_v \cdot s+1) \cdot e^{(-L_v \cdot s)} \tag{10}$$

In this equation (10), $T_v$ is a first-order lag time constant, and $L_v$ is a dead time due to a delay of a power train system.

By modeling a vehicle model of a controlled system in a manner of treating command drive torque $d_{FC}(t)$ as a control input (manipulated value) and vehicle speed $V_A(t)$ as a controlled value, the behavior of a vehicle power train is represented by a simplified linear model shown by the following equation (11).

$$V_A(t)=1/(m_v \cdot Rt \cdot s) \cdot e^{(-L_v \cdot s)} \cdot d_{FC}(t) \tag{11}$$

In this equation (11), Rt is an effective radius of a tire, and $m_v$ is a vehicle mass (weight).

The vehicle model, which employs command drive torque $d_{FC}(t)$ as an input and vehicle speed $V_A(t)$ as an output, performs an integral characteristic since the equation (11) of the vehicle model is of a 1/s type.

Although the controlled system (vehicle) performs a non-linear characteristic which includes a dead time $L_v$ due to the delay of the power train system and varies the dead time $L_v$ according to the employed actuators and engine, the vehicle model, which employs the command drive torque $d_{FC}(t)$ as an input and vehicle speed $V_A(t)$ as an output, can be represented by the equation (11) by means of the approximate zeroing method employing a disturbance estimator.

By corresponding the response characteristic of the controlled system of employing the command drive torque $d_{FC}(t)$ as an input and vehicle speed $V_A(t)$ as an output to a characteristic of the transfer function $G_v(s)$ having a predetermined first-order lag $T_v$ and the dead time $L_v$, the following relationship is obtained by using $C_1(s)$, $C_2(s)$ and $C_3(s)$ shown in FIG. 7.

$$C_1(s)=e^{(-L_v \cdot s)}/(T_H \cdot s+1) \tag{12}$$

$$C_2(s)=(m_v \cdot Rt \cdot s)/(T_H \cdot s+1) \tag{13}$$

$$d_v(t)=C_2(s) \cdot V_A(t)-C_1(s) \cdot d_{FC}(t) \tag{14}$$

In these equations (12), (13) and (14), $C_1(s)$ and $C_2(s)$ are disturbance estimators for the approximate zeroing method and perform as a compensator for suppressing the influence due to the disturbance and the modeling.

When a norm model $G_v(s)$ is treated as a first-order low-pass filter having a time constant $T_v$ upon neglecting the dead time of the controlled system, the model matching compensator $C_3(s)$ takes a constant as follows.

$$C_3(t)=m_v \cdot Rt/T_v \tag{15}$$

From these compensators $C_1(s)$, $C_2(s)$ and $C_3(s)$, the command drive torque $d_{FC}(t)$ is calculated from the following equation (16)

$$d_{FC}(t)=C_3(s) \cdot \{V_{COM}(t)-V_A(t)\}-\{C_2(s) \cdot V_A(t)-C_1(s) \cdot d_{FC}(t)\} \tag{16}$$

Figure 8:
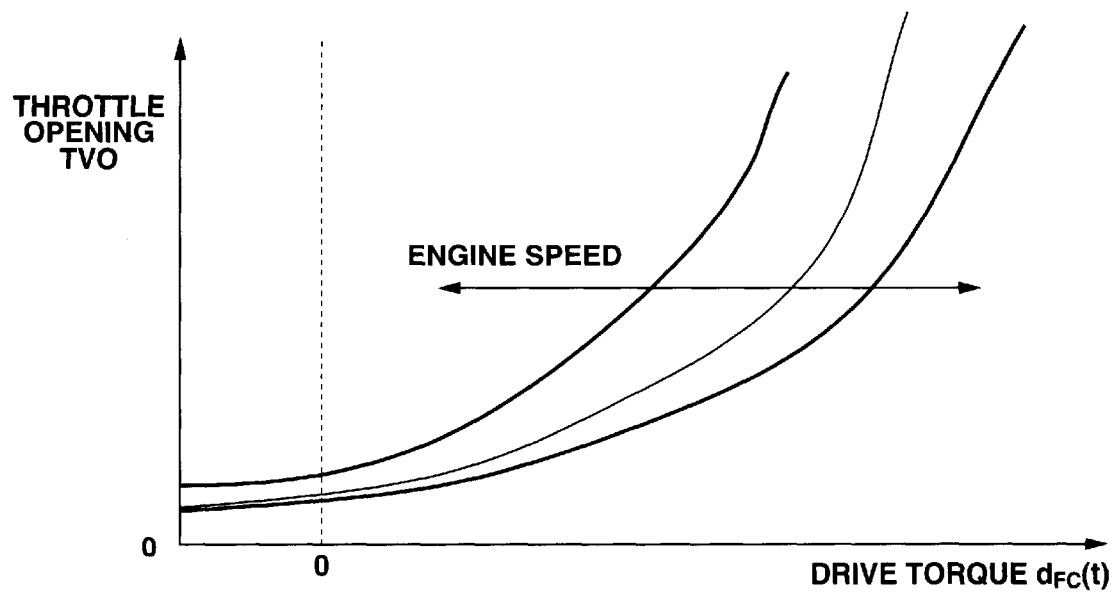
FIG. 8 is a map showing an engine nonlinear stationary characteristic.

A drive torque of the vehicle is controlled on the basis of command drive torque $d_{FC}(t)$. More specifically, the command throttle opening is calculated so as to bring actual drive torque $d_{FA}(t)$ closer to command drive torque $d_{FC}(t)$ by using a map indicative of an engine non-linear stationary characteristic. This map is shown in FIG. 8, the relationship represented by this map has been previously measured and stored. Further, when the required toque is negative and is not ensured by the negative drive torque of the engine, the vehicle control system operates the transmission and the brake system to ensure the required negative torque. Thus, by controlling the throttle opening, the transmission and the brake system, it becomes possible to modify the engine non-linear stationary characteristic into a linearized characteristic.

Since CVT 70 employed in this embodiment according to the present invention is provided with a torque converter with a lockup mechanism, vehicle speed control block 500 receives a lockup signal $LU_S$ from a controller of CVT 70. The lockup signal $LU_S$ indicates the lockup condition of CVT 70. When vehicle speed control block 500 decides that CVT 70 is put in an un-lockup condition on the basis of the lockup signal $LU_S$, vehicle speed control block 500 increases the time constant $T_H$ employed to represent the compensators $C_1(s)$ and $C_2(s)$ as shown in FIG. 7. The increase of the time constant $T_H$ decreases the vehicle speed control feedback correction quantity, which corresponds to a correction coefficient for keeping a desired response characteristic. Therefore, it becomes possible to adjust the model characteristic to the response characteristic of the controlled system under the un-lockup condition, although the response characteristic of the controlled system under the un-lockup condition delays as compared with that of the controlled system under the lockup condition. Accordingly, the stability of the vehicle speed control system is ensured under both lockup condition and un-lockup condition.

Command drive torque calculating block 530 shown in FIG. 7 is constructed by compensators $C_1(s)$ and $C_2(s)$ for compensating the transfer characteristic of the controlled system and compensator $C_3(s)$ for achieving a response characteristic previously designed by a designer.

Figure 12:
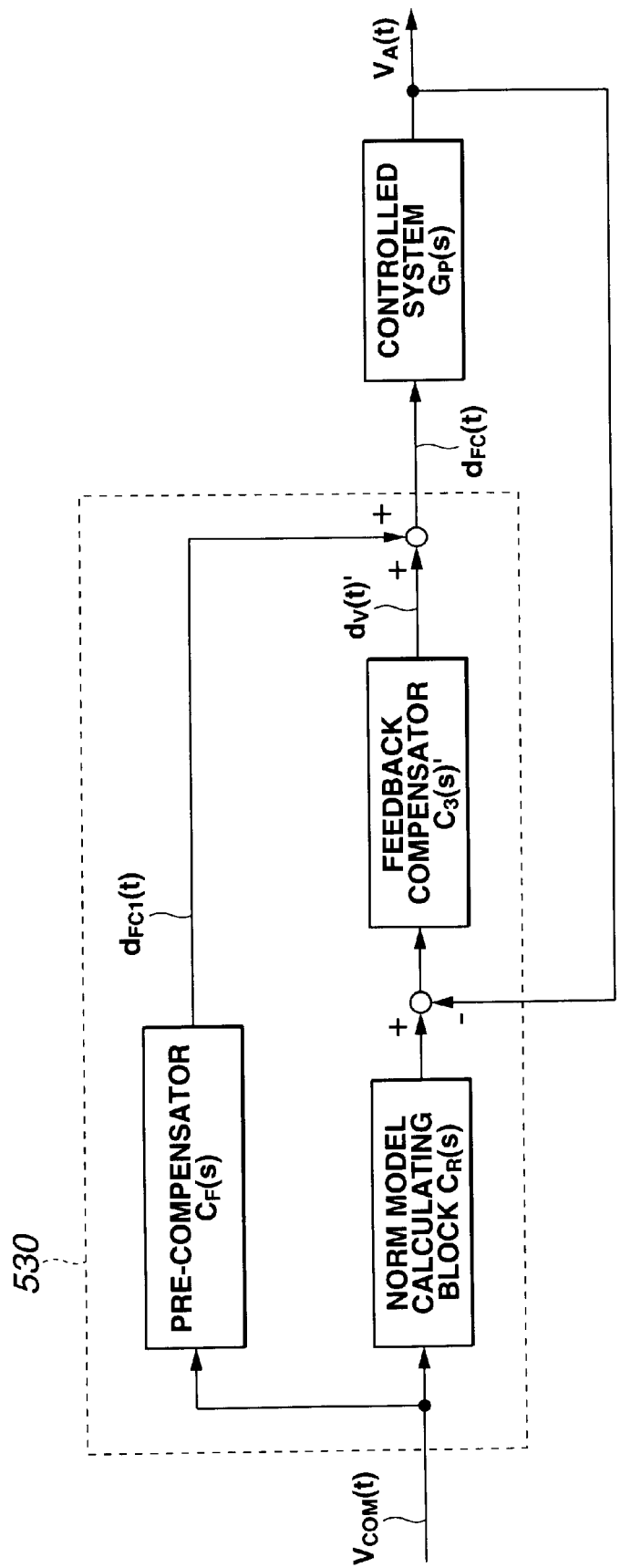
FIG. 12 is a block diagram showing another structure of command drive torque calculating block 530.

Further, command drive torque calculating block 530 may be constructed by a pre-compensator $C_F(s)$ for compensating so as to ensure a desired response characteristic determined by the designer, a norm model calculating block $C_R(s)$ for calculating the desired response characteristic determined by the designer and a feedback compensator $C_3(s)'$ for compensating a drift quantity (a difference between the target vehicle speed and the actual vehicle speed) with respect to the response characteristic of the norm model calculating section $C_R(s)$, as shown in FIG. 12.

The pre-compensator $C_F(s)$ calculates a standard command drive torque $d_{FC1}(t)$ by using a filter represented by the following equation (17), in order to achieve the transfer function $G_v(s)$ of the actual vehicle speed $V_A(t)$ with respect to the command vehicle speed $V_{COM}(t)$.

$$d_{FC1}(t) = m_v \cdot R_T \cdot s \cdot V_{COM}(t)/(T_v \cdot s + 1) \qquad (17)$$

Norm model calculating block $C_R(s)$ calculates a target response $V_T(t)$ of the vehicle speed control system from the transfer function $G_v(s)$ and the command vehicle speed $V_{COM}(t)$ as follows.

$$V_T(t) = G_v(s) \cdot V_{COM}(t) \qquad (18)$$

Feedback compensator $C_3(s)'$ calculates a correction quantity of the command drive torque so as to cancel a deviation thereby when the deviation between the target response $V_T(t)$ and the actual vehicle speed $V_A(t)$ is caused. That is, the correction quantity $d_v(t)'$ is calculated from the following equation (19).

$$d_v(t)' = [(K_p \cdot s + K_I)/s][V_T(t) - V_A(t)] \qquad (19)$$

In this equation (19), $K_p$ is a proportion control gain of the feedback compensator $C_3(s)'$, $K_I$ is an integral control gain of the feedback compensator $C_3(s)'$, and the correction quantity $d_v(t)'$ of the drive torque corresponds to an estimated disturbance $d_v(t)$ in FIG. 7.

When it is decided that CVT 70 is put in the un-lockup condition from the lockup condition signal $LU_S$, the correction quantity $d_v(t)'$ is calculated from the following equation (20).

$$d_v(t)' = [(K_p' \cdot s + K_I')/s][V_T(t) - V_A(t)] \qquad (20)$$

In this equation (20), $K_p' > K_p$, and $K_I' > K_I$. Therefore, the feedback gain in the un-lockup condition of CVT 70 is decreased as compared with that in the lockup condition of CVT 70. Further, command drive torque $d_{FC}(t)$ is calculated from a standard command drive torque $d_{FC1}(t)$ and the correction quantity $d_v(t)'$ as follows.

$$d_{FC1}(t) = d_{FC1}(t) + d_v(t)' \qquad (21)$$

That is, when CVT 70 is put in the un-lockup condition, the feedback gain is set at a smaller value as compared with the feedback gain in the lockup condition. Accordingly, the changing rate of the correction quantity of the command drive torque becomes smaller, and therefore it becomes possible to adapt the response characteristic of the controlled system which characteristic delays under the un-lockup condition of CVT 70 as compared with the characteristic in the lockup condition. Consequently, the stability of the vehicle speed control system is ensured under both of the lockup condition and the un-lockup condition.

Next, the actuator drive system of FIG. 1 will be discussed hereinafter.

A command gear ratio calculating block 540 of the vehicle speed control block 500 in FIG. 1 receives command drive torque $d_{FC}(t)$, vehicle speed $V_A(t)$, the output of coast switch 30 and the output of accelerator pedal sensor 90. Command gear ratio calculating block 540 calculates a command gear ratio DRATIO(t), which is a ratio of an input rotation speed and an output rotation speed of CVT 70, on the basis of the received information and outputs command gear ratio DRATIO(t) to CVT 70 as mentioned hereinafter.

Figure 9:
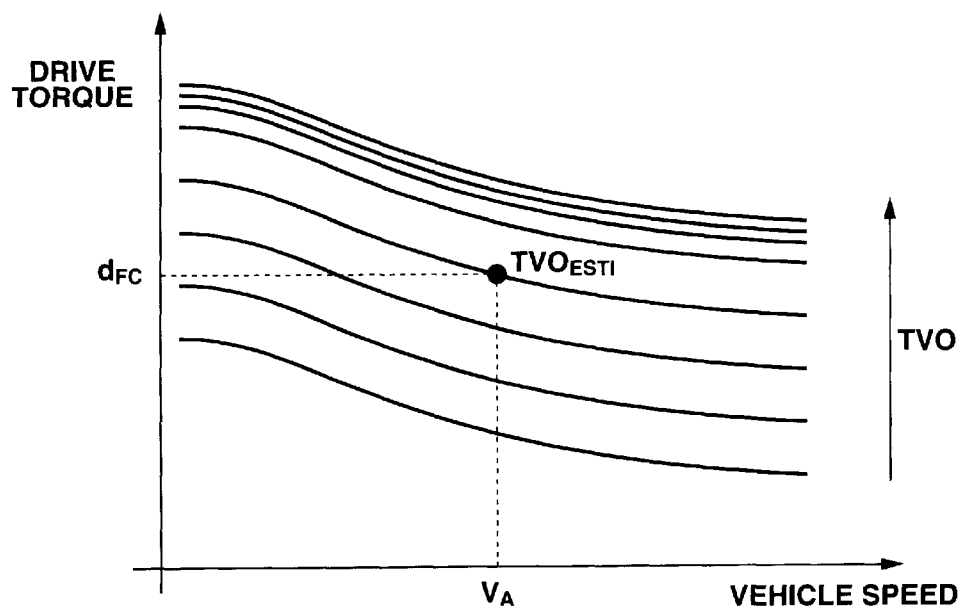
FIG. 9 is a map showing an estimated throttle opening.
Figure 10:
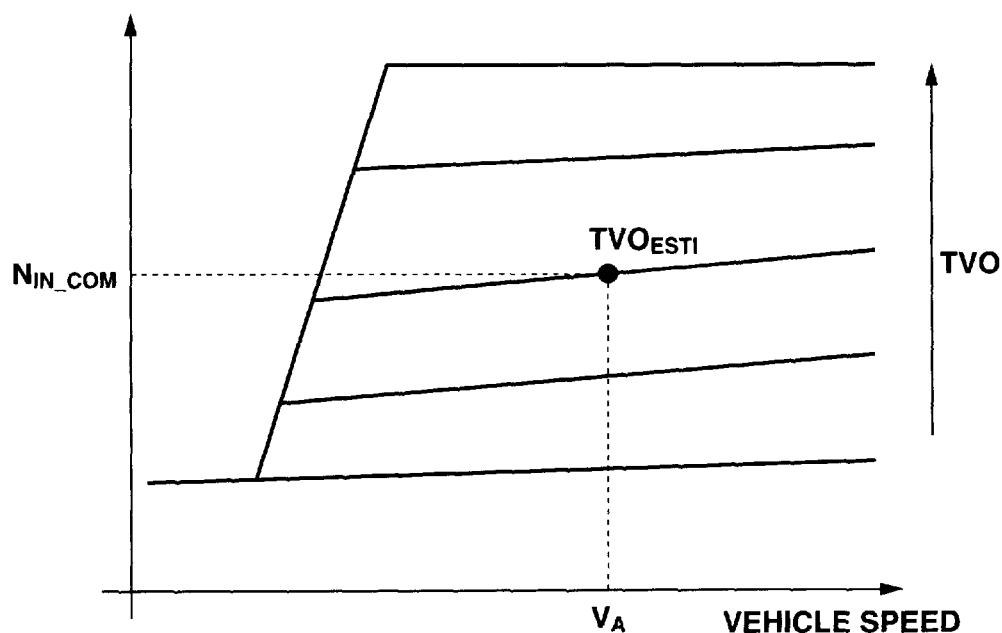
FIG. 10 is a map showing a shift map of a CVT.

(a) When coast switch 30 is put in an off state, an estimated throttle opening $TVO_{ESTI}$ is calculated from the throttle opening estimation map shown in FIG. 9 on the basis of vehicle speed $V_A(t)$ and command drive torque $d_{FC}(t)$. Then, a command engine rotation speed $N_{IN-COM}$ is calculated from the CVT shifting map shown in FIG. 10 on the basis of estimated throttle opening $TVO_{ESTI}$ and vehicle speed $V_A(t)$. By comparing command engine rotation speed $N_{IN-COM}$ with a preset first limit N1, command engine rotation speed $N_{IN-COM}$ is controlled so as not to become greater than the preset limit N1. Further, command gear ratio DRATIO(t) is obtained from the following equation (22) on the basis of vehicle speed $V_A(t)$ and command engine rotation speed $N_{IN-COM}$.

$$DRATIO(t) = N_{IN-COM} \cdot 2\pi \cdot Rt/[60 \cdot V_A(t) \cdot Gf] \qquad (22)$$

In this equation (22), Gf is a final gear ratio.

Command transmission calculating block 540 employs a second limit N2, which is smaller than the first limit N1, instead of the first limit N1 when the output of the vehicle speed control suspending signal is stopped, that is, when the vehicle speed control is restarted. This arrangement is executed for the following reason. When the vehicle speed control is now being executed, a driver considers that the control of the vehicle speed is dependent on the vehicle speed control system. Therefore, in this vehicle speed control condition, the driver does not feel a strange feel even if the engine rotation speed is increased for decelerating the vehicle. However, in the situation that the driver once depressed the accelerator pedal and then returned the accelerator pedal, the driver may feel a strange feel if the engine rotation speed is increased. Therefore, in order to avoid such the undesired increase of the engine rotation speed just after returning the accelerator pedal following to depress the accelerator pedal, the smaller limit N2 is employed instead of the first limit N1 in this situation.

(b) When coast switch 30 is switched on, that is, when maximum value $V_{SMAX}$ of the command vehicle speed is decreased by switching on coast switch 30, the previous value of command gear ratio DRATIO(t−1) is maintained as the present command gear ratio DRATIO(t). Therefore, even when coast switch 30 is continuously switched on, command gear ratio DRATIO(t) is maintained at the value set just before the switching on of coast switch 30 until coast switch is switched off. That is, the shift down is prohibited for a period from the switching on of coast switch 30 to the switching off of coast switch 30.

More specifically, when the set speed of the vehicle speed control system is once decreased by operating coast switch 30 and is then increased by operating accelerate switch 40, the shift down is prohibited during this period. Therefore, even if the throttle opening is opened to accelerate the vehicle, the engine rotation speed is never radically increased under such a transmission condition. This prevents the engine from generating noises excessively.

An actual gear ratio calculating block 550 of FIG. 1 calculates an actual gear ratio RATIO(t), which is a ratio of an actual input rotation speed and an actual output rotation speed of CVT 70, from the following equation on the basis of the engine rotation speed $N_E(t)$ and vehicle speed $V_A(t)$ which is obtained by detecting an engine spark signal through engine speed sensor 80.

$$RATIO(t)=N_E(t)/[V_A(t) \cdot Gf \cdot 2\pi Rt] \quad (23)$$

A command engine torque calculating block 560 of FIG. 1 calculates a command engine torque $TE_{COM}(t)$ from command drive torque $d_{FC}(t)$, actual gear ratio RATIO(t) and the following equation (24).

$$TE_{COM}(t)=d_{FC}(t)/[Gf \cdot RATIO(t)] \quad (24)$$

Figure 11:
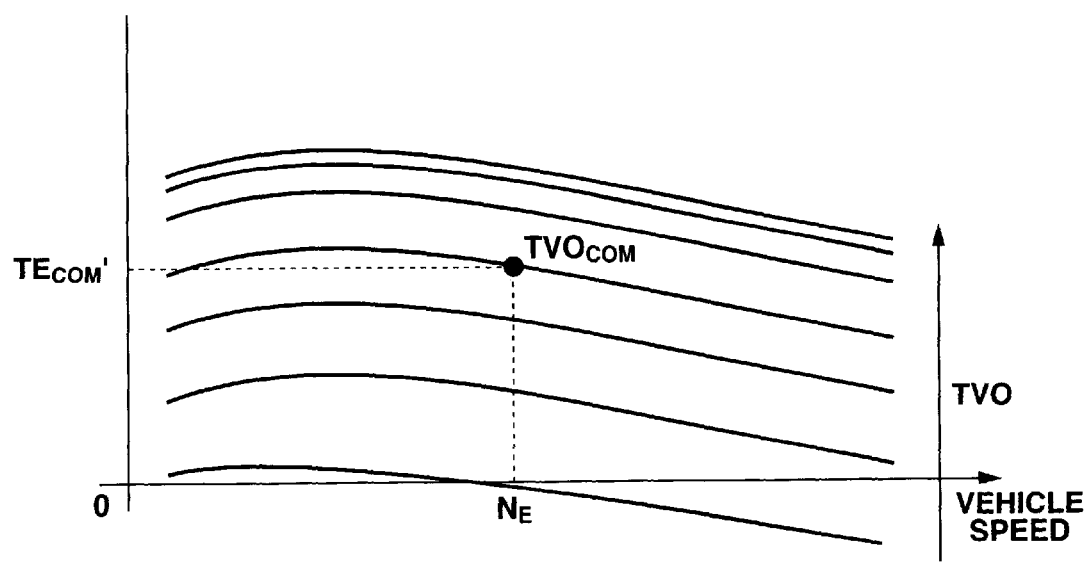
FIG. 11 is a map showing an engine performance.

A target throttle opening calculating block 570 of FIG. 1 calculates a target throttle opening $TVO_{COM}$ from the engine performance map shown in FIG. 11 on the basis of command engine torque $TE_{COM}(t)$ and engine rotation speed $N_E(t)$, and outputs the calculated target throttle opening $TVO_{COM}$ to throttle actuator 60.

A command brake pressure calculating block 630 of FIG. 1 calculates an engine brake torque $TE_{COM}'$ during a throttle full closed condition from the engine performance map shown in FIG. 11 on the basis of engine rotation speed $N_E(t)$. Further, command brake pressure calculating block 630 calculates a command brake pressure $REF_{PBRK}(t)$ from the throttle full-close engine brake torque $TE_{COM}'$, command engine torque $TE_{COM}(t)$ and the following equation (25).

$$REF_{PBRK}(t)=(TE_{COM}-TE_{COM}') \cdot Gm \cdot Gf/\{4 \cdot (2 \cdot AB \cdot RB \cdot \mu B)\} \quad (25)$$

In this equation (25), Gm is a gear ratio of CVT 70, AB is a wheel cylinder force (cylinder pressure×area), RB is an effective radius of a disc rotor, and $\mu B$ is a pad friction coefficient.

Next, the suspending process of the vehicle speed control will be discussed hereinafter.

A vehicle speed control suspension deciding block 620 of FIG. 1 receives an accelerator control input APO detected by accelerator pedal sensor 90 and compares accelerator control input APO with a predetermined value. The predetermined value is an accelerator control input $APO_1$ corresponding to a target throttle opening $TVO_{COM}$ inputted from a target throttle opening calculating block 570, that is a throttle opening corresponding to the vehicle speed automatically controlled at this moment. When accelerator control input APO is greater than a predetermined value, that is, when a throttle opening becomes greater than a throttle opening controlled by throttle actuator 60 due to the accelerator pedal depressing operation of the drive, vehicle speed control suspension deciding block 620 outputs a vehicle speed control suspending signal.

Command drive torque calculating block 530 and target throttle opening calculating block 570 initialize the calculations, respectively in reply to the vehicle speed control suspending signal, and the transmission controller of CVT 70 switches the shift-map from a constant speed traveling shift-map to a normal traveling shift map. That is, the vehicle speed control system according to the present invention suspends the constant speed traveling, and starts the normal traveling according to the accelerator pedal operation of the driver.

The transmission controller of CVT 70 has stored the normal traveling shift map and the constant speed traveling shift map, and when the vehicle speed control system according to the present invention decides to suspend the constant vehicle speed control, the vehicle speed control system commands the transmission controller of CVT 70 to switch the shift map from the constant speed traveling shift map to the normal traveling shift map. The normal traveling shift map has a high responsibility characteristic so that the shift down is quickly executed during the acceleration. The constant speed traveling shift map has a mild characteristic which impresses a smooth and mild feeling to a driver when the shift map is switched from the constant speed traveling mode to the normal traveling mode.

Vehicle speed control suspension deciding block 620 stops outputting the vehicle speed control suspending signal when the accelerator control input APO returns to a value smaller than the predetermined value. Further, when the accelerator control input APO is smaller than the predetermined value and when vehicle speed $V_A(t)$ is greater than the maximum value $V_{SMAX}$ of the command vehicle speed, vehicle speed control suspension deciding block 620 outputs the deceleration command to the command drive torque calculating block 530.

When the output of the vehicle speed control suspending signal is stopped and when the deceleration command is outputted, command drive torque calculating block 530 basically executes the deceleration control according to the throttle opening calculated at target throttle opening calculating block 570 so as to achieve command drive torque $d_{FC}(t)$. However, when command drive torque $d_{FC}(t)$ cannot be achieved only by fully closing the throttle, the transmission control is further employed in addition to the throttle control. More specifically, in such a large deceleration force required condition, command gear ratio calculating block 540 outputs the command gear ratio DRATIO (shift down command) regardless the road gradient, such as traveling on a down slope or a flat road. CVT 70 executes the shift down control according to the command gear ratio DRATIO to supply the shortage of the decelerating force.

In addition to the above arrangement of employing the shift down control of CVT 70 based on the magnitude of the deceleration in the restarting operation of the vehicle speed control, the shift down control may be utilized when a time period to the target vehicle speed, which is achieved by the full closing of the throttle, becomes greater than a predetermined time period. More specifically, vehicle speed control block 500 may be arranged to employ the shift down control of the CVT in order to decelerate the vehicle at the target vehicle speed when the predetermined time period cannot be ensured by fully closing the throttle.

Further, when command drive torque $d_{FC}(t)$ is not ensured by both the throttle control and the transmission control, and when the vehicle travels on a flat road, the shortage of command drive torque $d_{FC}(t)$ is supplied by employing the brake system. However, when the vehicle travels on a down slop, the braking control by the brake system is prohibited by outputting a brake control prohibiting signal BP from command drive torque calculating block 530 to a command brake pressure calculating block 630. The reason for prohibiting the braking control of the brake system on the down slop is as follows.

If the vehicle on the down slope is decelerated by means of the brake system, it is necessary to continuously execute the braking. This continuous braking may cause the brake fade. Therefore, in order to prevent the brake fade, the vehicle speed control system according to the present invention is arranged to execute the deceleration of the vehicle by means of the throttle control and the transmission control without employing the brake system when the vehicle travels on a down slope.

With the thus arranged suspending method, even when the constant vehicle speed cruise control is restarted after the constant vehicle speed cruise control is suspended in response to the temporal acceleration caused by depressing the accelerator pedal, a larger deceleration as compared with that only by the throttle control is ensured by the down shift of the transmission. Therefore, the conversion time period to the target vehicle speed is further shortened. Further, by employing a continuously variable transmission (CVT 70) for the deceleration, a shift shock is prevented even when the vehicle travels on the down slope. Further, since the deceleration ensured by the transmission control and the throttle control is larger than that only by the throttle control and since the transmission control and the throttle control are executed to smoothly achieve the drive torque on the basis of the command vehicle speed variation $\Delta V_{COM}$, it is possible to smoothly decelerate the vehicle while keeping the deceleration degree at the predetermined value. In contrast to this, if a normal non-CVT automatic transmission is employed, a shift shock is generated during the shift down, and therefore even when the larger deceleration is requested, the conventional system employed a non-CVT transmission has executed only the throttle control and has not executed the shift down control of the transmission.

By employing a continuously variable transmission (CVT) with the vehicle speed control system, it becomes possible to smoothly shift down the gear ratio of the transmission. Therefore, when the vehicle is decelerated for continuing the vehicle speed control, a deceleration greater than that only by the throttle control is smoothly executed.

Next, a stopping process of the vehicle speed control will be discussed.

A drive wheel acceleration calculating block 600 of FIG. 1 receives vehicle speed $V_A(t)$ and calculates a drive wheel acceleration $\alpha_{OBS}(t)$ from the following equation (26).

$$\alpha_{OBS}(t)=[K_{OBS} \cdot s/(T_{OBS} \cdot s^2+s+K_{OBS})] \cdot V_A(t) \quad (26)$$

In this equation (26), $K_{OBS}$ is a constant, and $T_{OBS}$ is a time constant.

Since vehicle speed $V_A(t)$ is a value calculated from the rotation speed of a tire (drive wheel), the value of vehicle speed $V_A(t)$ corresponds to the rotation speed of the drive wheel. Accordingly, drive wheel acceleration $\alpha_{OBS}(t)$ is a variation (drive wheel acceleration) of the vehicle speed obtained from the derive wheel speed $V_A(t)$.

Vehicle speed control stop deciding block 610 compares drive wheel acceleration $\alpha_{OBS}(t)$ calculated at drive torque calculating block 600 with the predetermined acceleration limit α which corresponds to the variation of the vehicle speed, such as 0.2 G. When drive wheel acceleration $\alpha_{OBS}(t)$ becomes greater than the acceleration limit α, vehicle speed control stop deciding block 610 outputs the vehicle speed control stopping signal to command drive torque calculating block 530 and target throttle opening calculating block 570. In reply to the vehicle speed control stopping signal, command drive torque calculating block 530 and target throttle opening calculating block 570 initialize the calculations thereof respectively. Further, when the vehicle speed control is once stopped, the vehicle speed control is not started until set switch 20 is again switched on.

Since the vehicle speed control system shown in FIG. 1 controls the vehicle speed at the command vehicle speed based on command vehicle speed variation $\Delta V_{COM}$ determined at command vehicle speed variation determining block 590. Therefore, when the vehicle is normally controlled, the vehicle speed variation never becomes greater than the limit of the command vehicle speed variation, for example, 0.06 G=0.021 (km/h/10 ms). Accordingly, when drive wheel acceleration $\alpha_{OBS}(t)$ becomes greater than the predetermined acceleration limit a which corresponds to the limit of the command vehicle speed acceleration, there is a possibility that the drive wheels are slipping. That is, by comparing drive wheel acceleration $\alpha_{OBS}(t)$ with the predetermined acceleration limit α, it is possible to detect the generation of slippage of the vehicle. Accordingly, it becomes possible to execute the slip decision and the stop decision of the vehicle speed control, by obtaining drive wheel acceleration $\alpha_{OBS}(t)$ from the output of the normal vehicle speed sensor without providing an acceleration sensor in a slip suppressing system such as TCS (traction control system) and without detecting a difference between a rotation speed of the drive wheel and a rotation speed of a driven wheel. Further, by increasing the command vehicle speed variation $\Delta V_{COM}$, it is possible to improve the responsibility of the system to the target vehicle speed.

Although the embodiment according to the present invention has been shown and described such that the stop decision of the vehicle speed control is executed on the basis of the comparison between the drive wheel acceleration $\alpha_{OBS}(t)$ and the predetermined value, the invention is not limited to this and may be arranged such that the stop decision is made when a difference between the command vehicle variation $\Delta V_{COM}$ and drive wheel acceleration $\alpha_{OBS}(t)$ becomes greater than a predetermined value.

Command vehicle speed determining block 510 of FIG. 1 decides whether $V_{SMAX} < V_A$, that is, whether the command vehicle speed $V_{COM}(t)$ is greater than vehicle speed $V_A(t)$ and is varied to the decelerating direction. Command vehicle speed determining block 510 sets command vehicle speed $V_{COM}(t)$ at vehicle speed $V_A(t)$ or a predetermined vehicle speed smaller than vehicle speed $V_A(t)$, such as at a value obtained by subtracting 5 km/h from vehicle speed $V_A(t)$, and sets the initial values of integrators $C_2(s)$ and $C_1(s)$ at vehicle speed $V_A(t)$ so as to set the output of the equation $C_2(s) \cdot V_A(t) - C_1(s) \cdot d_{FC}(t) = d_v(t)$ at zero. As a result of this settings, the outputs of $C_1(s)$ and $C_2(s)$ become $V_A(t)$ and therefore the estimated disturbance $d_v(t)$ becomes zero. Further, this control is executed when the variation $\Delta V_{COM}$ which is a changing rate of command vehicle speed $V_{COM}$ is greater in the deceleration direction than the predetermined deceleration, such as 0.06 G. With this arrangement, it becomes possible to facilitate unnecessary initialization of the command vehicle speed ($V_A(t) \rightarrow V_{COM}(t)$) and initialization of the integrators, and to decrease the shock due to the deceleration.

Further, when the command vehicle speed (command control value at each time until the actual vehicle speed reaches the target vehicle speed) is greater than the actual vehicle speed and when the time variation (change rate) of the command vehicle speed is turned to the decelerating direction, by changing the command vehicle speed to the actual vehicle speed or the predetermined speed smaller than the actual vehicle speed, the actual vehicle speed is quickly converged into the target vehicle speed. Furthermore, it is possible to keep the continuing performance of the control by initializing the calculation of command drive torque calculating block 530 from employing the actual vehicle speed or a speed smaller than the actual vehicle speed.

Further, if the vehicle speed control system is arranged to execute a control for bringing an actual inter-vehicle distance closer to a target inter-vehicle distance so as to execute a vehicle traveling while keeping a target inter-vehicle distance set by a driver with respect to a preceding vehicle, the vehicle speed control system is arranged to set the command vehicle speed so as to keep the target inter-vehicle distance. In this situation, when the actual inter-vehicle distance is lower than a predetermined distance and when the command vehicle speed variation $\Delta V_{COM}$ is greater than the predetermined value (0.06 G) in the deceleration direction, the change ($V_A \rightarrow V_{COM}$) of the command vehicle speed $V_{COM}$ and the initialization of command drive torque calculating block 530 (particularly, integrator) are executed. With this arrangement, it becomes possible to quickly converge the inter-vehicle distance to the target inter-vehicle distance. Accordingly, the excessive approach to the preceding vehicle is prevented, and the continuity of the control is maintained. Further, the decrease of the unnecessary initialization ($V_A(t) \rightarrow V_{COM}(t)$ and initialization of integrators) decreases the generation of the shift down shock.

The entire contents of Japanese Patent Applications No. 2000-143621 filed on May 16, 2000 in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

INDUSTRIAL APPLICABILITY

A vehicle speed control system according to the present invention is applicable to an automotive vehicle equipped with a continuously variable transmission.

What is claimed is:

1. A vehicle speed control system for a vehicle, the vehicle equipped with an engine and a continuously variable transmission (CVT), the vehicle control system comprising:
 a controller configured to:
  execute a vehicle speed control for bringing a vehicle speed closer to a target vehicle speed;
  suspend the vehicle speed control when a throttle opening is increased to an opening which is greater than a target throttle opening for the vehicle speed control;
  restart the suspended vehicle speed control when the throttle opening becomes smaller than the target throttle opening;
  decrease the throttle opening and execute a shift down of the CVT when the vehicle speed at the moment of restarting the vehicle speed control is greater than or equal to the target vehicle speed; and
  control the engine rotation speed within a predetermined limit when the vehicle speed at the moment of restarting the vehicle speed control is greater than or equal to the target vehicle speed.

2. The vehicle speed control system as claimed in claim 1, wherein said controller commands the CVT to execute the shift down of the CVT when a deceleration ensured only by decreasing the throttle opening is smaller than a desired deceleration of the vehicle speed control.

3. The vehicle speed control system as claimed in claim 2, wherein a CVT controller of the CVT has stored a normal traveling shift map adapted for a normal traveling of the vehicle and a constant speed traveling shift map for the vehicle speed control, said controller commands the CVT controller to switch a shift map from the constant speed traveling shift map to the normal traveling shift map when said controller suspends the vehicle speed control.

4. The vehicle speed control system as claimed in claim 1, wherein said controller decreases the throttle opening at the rate of a predetermined deceleration, said controller executing the shift down of the CVT when the deceleration by decreasing the throttle opening is smaller than the predetermined deceleration.

5. The vehicle speed control system as claimed in claim 1, wherein the predetermined limit for the engine rotation speed is set smaller than a limit employed in the condition except for the condition that the vehicle speed at the moment of restarting the vehicle speed control is greater than or equal to the target vehicle speed.

6. The vehicle speed control system as claimed in claim 5, wherein said controller commands the CVT to execute the shift down of the CVT when a time period to the target vehicle speed, which time is achieved by the full closing of the throttle, becomes greater than a predetermined time period.

7. A vehicle speed control system for a vehicle, the vehicle equipped with an engine and a continuously variable transmission (CVT), the vehicle control system comprising:
 a controller configured to:
  execute a vehicle speed control for bringing a vehicle speed closer to a target vehicle speed;
  suspend the vehicle speed control when a throttle opening is increased to an opening which is greater than a target throttle opening for the vehicle speed control;
  restart the suspended vehicle speed control when the throttle opening becomes smaller than the target throttle opening;
  decrease the throttle opening and execute a shift down of the CVT when the vehicle speed at the moment of restarting the vehicle speed control is greater than or equal to the target vehicle speed; and prohibit a brake system of the vehicle from being operated when the vehicle speed at the moment of restarting the vehicle speed control is greater than or equal to the target vehicle speed.

8. The vehicle speed control system as claimed in claim 7, wherein said controller prohibits the brake system from being operated when the vehicle travels on a down slope.

9. The vehicle speed control system as claimed in claim 7, wherein said controller commands the CVT to execute the shift-down of the CVT when a deceleration ensured only by decreasing the throttle opening is smaller than a desired deceleration of the vehicle speed control.

10. The vehicle speed control system as claimed in claim 9, wherein a CVT controller of the CVT has stored a normal traveling shift map adapted for a normal traveling of the vehicle and a constant speed traveling shift map for the vehicle speed control, said controller commands the CVT controller to switch a shift map from the constant speed traveling shift map to the normal traveling shift map when said controller suspends the vehicle speed control.

11. The vehicle speed control system as claimed in claim 7, wherein said controller decreases the throttle opening at the rate of a predetermined deceleration, said controller executing the shift down of the CVT when the deceleration by decreasing the throttle opening is smaller than the predetermined deceleration.

12. A method for controlling a vehicle speed of a vehicle, the vehicle equipped with an engine and a continuously variable transmission (CVT), the method comprising:

executing a vehicle speed control to bring a vehicle speed to a target vehicle speed;

suspending the vehicle speed control when a throttle opening is increased to an opening which is greater than a target throttle opening for the vehicle speed control;

restarting the vehicle speed control when the throttle opening becomes smaller than the target throttle opening for the vehicle speed control;

decreasing the throttle opening and shifting down the CVT when the vehicle speed at the moment of restarting the vehicle speed control is greater than or equal to the target vehicle speed; and controlling the engine rotation speed within a predetermined limit when the vehicle speed at the moment of restarting the vehicle speed control is greater than or equal to the target vehicle speed.

13. A method for controlling a vehicle speed of a vehicle, the vehicle equipped with an engine and a continuously variable transmission (CVT), the method comprising:

executing a vehicle speed control to bring a vehicle speed to a target vehicle speed;

suspending the vehicle speed control when a throttle opening is increased to an opening which is greater than a target throttle opening for the vehicle speed control;

restarting the vehicle speed control when the throttle opening becomes smaller than the target throttle opening for the vehicle speed control;

decreasing the throttle opening and shifting down the CVT when the vehicle speed at the moment of restarting the vehicle speed control is greater than or equal to the target vehicle speed; and prohibiting a brake system of the vehicle from being operated when the vehicle speed at the moment of restarting the vehicle speed control is greater than or equal to the target vehicle speed.

* * * * *